US009655073B2

United States Patent
Lauer et al.

(10) Patent No.: US 9,655,073 B2
(45) Date of Patent: May 16, 2017

(54) SYSTEMS AND METHODS FOR COMMUNICATING WITH NON-TERRESTRIAL ELECTRONIC DEVICES

(71) Applicant: GOGO LLC, Itasca, IL (US)

(72) Inventors: Bryan Adrian Lauer, Hinckley, IL (US); Kathy Wang, Buffalo Grove, IL (US); Tony LaMarca, Loves Park, IL (US); Paresh Kanabar, Naperville, IL (US); Premkumar Bangole, Bloomingdale, IL (US); Pat Walsh, Naperville, IL (US)

(73) Assignee: GOGO LLC, Chicago, IL (US)

( * ) Notice: Subject to any disclaimer, the term of this patent is extended or adjusted under 35 U.S.C. 154(b) by 55 days.

(21) Appl. No.: 14/291,979

(22) Filed: May 30, 2014

(65) Prior Publication Data
US 2015/0351066 A1 Dec. 3, 2015

(51) Int. Cl.
*H04W 60/04* (2009.01)
*H04W 4/12* (2009.01)
(Continued)

(52) U.S. Cl.
CPC ........ *H04W 60/04* (2013.01); *G06F 21/6209* (2013.01); *G06Q 10/025* (2013.01);
(Continued)

(58) Field of Classification Search
CPC .................................................. H04W 60/04
See application file for complete search history.

(56) References Cited

U.S. PATENT DOCUMENTS

| 5,546,397 A | 8/1996 | Mahany |
| 5,557,656 A | 9/1996 | Ray et al. |

(Continued)

FOREIGN PATENT DOCUMENTS

| EP | 0 902 551 A2 | 3/1999 |
| EP | 1 976 152 A1 | 10/2008 |

(Continued)

OTHER PUBLICATIONS

"Aero Mobile Terminals: Models 2540/2532" Product Sheet, ViaSat, 2 pp. (2012).

(Continued)

*Primary Examiner* — Mazda Sabouri
(74) *Attorney, Agent, or Firm* — Marshall, Gerstein & Borun LLP; Randall G. Rueth

(57) ABSTRACT

Embodiments are provided for communicating with electronic devices traveling on an aircraft. According to certain aspects, a data center can examine registration data to identify a set of electronic devices that are traveling on a particular flight, and can retrieve relevant travel information associated with the set of electronic devices. In particular, the travel information may be general to the flight or may be related to a specific itinerary for one of the passengers. The data center may generate one or more text messages that are intended for one of more of the set of electronic devices. The data center may also transmit the text message(s) to an on-board network for delivery to the electronic device(s).

14 Claims, 7 Drawing Sheets

(51) Int. Cl.
H04L 29/12 (2006.01)
H04M 15/00 (2006.01)
G06Q 30/02 (2012.01)
G06Q 10/02 (2012.01)
H04W 4/04 (2009.01)
G06F 21/62 (2013.01)
H04L 12/58 (2006.01)
H04B 7/185 (2006.01)
H04L 29/08 (2006.01)

(52) U.S. Cl.
CPC ......... *G06Q 30/0281* (2013.01); *H04L 51/00* (2013.01); *H04L 51/38* (2013.01); *H04L 61/6054* (2013.01); *H04M 15/60* (2013.01); *H04M 15/63* (2013.01); *H04M 15/68* (2013.01); *H04W 4/046* (2013.01); *H04W 4/12* (2013.01); *G06F 2221/2101* (2013.01); *G06F 2221/2111* (2013.01); *G06F 2221/2117* (2013.01); *H04B 7/18506* (2013.01); *H04L 67/12* (2013.01); *H04W 4/043* (2013.01)

(56) References Cited

U.S. PATENT DOCUMENTS

| | | | |
|---|---|---|---|
| 5,652,795 | A | 7/1997 | Dillon et al. |
| 5,699,384 | A | 12/1997 | Dillon |
| 5,722,074 | A | 2/1998 | Muszynski |
| 5,740,366 | A | 4/1998 | Mahany et al. |
| 5,844,893 | A | 12/1998 | Gollnick et al. |
| 5,940,771 | A | 8/1999 | Gollnick et al. |
| 5,950,129 | A * | 9/1999 | Schmid .............. H04B 7/18508 455/12.1 |
| 5,995,725 | A | 11/1999 | Dillon |
| 5,995,726 | A | 11/1999 | Dillon |
| 5,995,833 | A | 11/1999 | Zicker |
| 6,009,328 | A | 12/1999 | Muszynski |
| 6,016,388 | A | 1/2000 | Dillon |
| 6,125,184 | A | 9/2000 | Dillon et al. |
| 6,131,160 | A | 10/2000 | Dillon et al. |
| 6,161,141 | A | 12/2000 | Dillon |
| 6,310,582 | B1 | 10/2001 | Uetake et al. |
| 6,374,311 | B1 | 4/2002 | Mahany et al. |
| 6,665,536 | B1 | 12/2003 | Mahany |
| 6,697,415 | B1 | 2/2004 | Mahany |
| 6,714,559 | B1 | 3/2004 | Meier |
| 6,788,935 | B1 | 9/2004 | McKenna et al. |
| 7,013,138 | B2 | 3/2006 | Mahany |
| 7,062,268 | B2 | 6/2006 | McKenna |
| 7,107,062 | B2 | 9/2006 | Cruz et al. |
| 7,386,002 | B2 | 6/2008 | Meier |
| 7,457,646 | B2 | 11/2008 | Mahany et al. |
| 7,535,921 | B2 | 5/2009 | Meier |
| 7,536,167 | B2 | 5/2009 | Gollnick et al. |
| 7,548,553 | B2 | 6/2009 | Meier |
| 7,558,569 | B2 | 7/2009 | Chang et al. |
| 7,636,552 | B2 | 12/2009 | Monk |
| 7,702,328 | B2 | 4/2010 | Lemond et al. |
| 7,710,907 | B2 | 5/2010 | Mahany |
| 7,751,814 | B2 | 7/2010 | Cruz et al. |
| 7,873,343 | B2 | 1/2011 | Gollnick et al. |
| 7,916,747 | B2 | 3/2011 | Meier |
| RE42,536 | E | 7/2011 | Leuca et al. |
| 8,068,829 | B2 | 11/2011 | Lemond et al. |
| 8,078,163 | B2 | 12/2011 | Lemond et al. |
| 8,094,605 | B2 | 1/2012 | Lynch et al. |
| 8,169,946 | B2 | 5/2012 | Lynch et al. |
| 8,280,309 | B2 | 10/2012 | Monk |
| 8,452,276 | B2 | 5/2013 | Lauer |
| 2002/0170060 | A1 | 11/2002 | Lyman |
| 2004/0142658 | A1 | 7/2004 | McKenna et al. |
| 2006/0229070 | A1 | 10/2006 | de La Chapelle et al. |
| 2007/0021117 | A1 | 1/2007 | McKenna et al. |
| 2007/0042772 | A1 | 2/2007 | Salkini et al. |
| 2008/0004016 | A1 | 1/2008 | Smee et al. |
| 2008/0133705 | A1* | 6/2008 | Lemond ................ G06Q 30/04 709/217 |
| 2008/0182573 | A1 | 7/2008 | Lauer et al. |
| 2009/0187640 | A1* | 7/2009 | Delia .................... G06Q 50/30 709/219 |
| 2009/0274097 | A1 | 11/2009 | Budinger et al. |
| 2009/0286517 | A1 | 11/2009 | Muirhead |
| 2010/0167723 | A1* | 7/2010 | Soumier ............ H04B 7/18506 455/431 |
| 2011/0265128 | A1 | 10/2011 | Bengeult et al. |
| 2013/0029701 | A1* | 1/2013 | Cabos ................ H04B 7/18502 455/466 |
| 2014/0282038 | A1* | 9/2014 | Royster ................ G01C 21/206 715/738 |

FOREIGN PATENT DOCUMENTS

| | | |
|---|---|---|
| EP | 2 568 533 A1 | 3/2013 |
| GB | 2310973 | 9/1997 |
| WO | WO-00/76087 | 12/2000 |
| WO | WO-01/41317 A2 | 6/2001 |
| WO | WO-2011/128833 | 10/2011 |

OTHER PUBLICATIONS

"Direcway™ DW3000/DW4000 Series Systems: Satisfying the Need for Speed for the Multimedia Internet," Hughes Network Systems, 2 pp. (Jun. 2001).

"Exede® Internet: Fastest In-Flight Wi-Fi Unleash the Internet," ViaSat, 4 pp. (2012).

"Gogo Partners with AeroSat to Bring Ku-Satellite Service to Market," Gogo LLC, 2 pp. (May 18, 2012).

"Hughes and ThinKom Demonstrate New Tactical Communications Solutions," press release, Hughes Network Systems, LLC, 2 pp. (Oct. 25, 2012).

"Hughes HX200 Broadband Satellite Router," Hughes Network Systems, LLC, 2 pp. (2012).

ETSI Technical Specification 102 441 (v1.1.1), "Digital Video Broadcasting (DVB); DVB-S2 Adaptive Coding and Modulation for Broadband Hybrid Satellite Dialup Applications", European Telecommunications Standards Institute (ETSI), European Broadcasting Union, 23 pp. (2005).

European Standard 301 195 (v1.1.1), "Digital Video Broadcasting (DVB); Interaction channel through the Global System for Mobile communications (GSM)," European Telecommunications Standards Institute (ETSI), 14 pp. (Feb. 1999).

European Telecommunication Standard (ETS 300 801), "Digital Video Broadcasting (DVB); Interaction channel through Public Switched Telecommunications Network (PSTN) / Integrated Services Digital Networks (ISDN)," European Telecommunications Standards Institute (ETSI), 14 pp. (Aug. 1997).

International Search Report and Written Opinion, International Application No. PCT/US2015/033296, mailed Aug. 13, 2015.

"3rd Generation Partnership Project: Technical Specification Group Core Network and Terminals: Support of SMS over IP networks; Stage 3 (Release 12)", 3GPP Standard; 3GPP TS 24.341, 3rd Generation Partnership Project Mobile Competence Centre, (Dec. 19, 2013).

Kaji et al., TLS Handshake Method Based on SIP, pp. 467-75, Proc. Intl. Multiconference Computer Sci. Info. Tech., downloaded from the Internet at <http://www.proceedings2006.imcsit.org/pliks/89.pdf> (retrieved on Aug. 10, 2015).

* cited by examiner

SYSTEMS AND METHODS FOR COMMUNICATING WITH NON-TERRESTRIAL ELECTRONIC DEVICES

FIELD

The present disclosure relates generally to communicating with electronic devices and, in particular, to systems, methods, and techniques for generating messages based on various travel data and sending the messages to electronic devices connected to a non-terrestrial communication network.

BACKGROUND

Currently, existing airlines and other transportation companies provide various services to mobile or wireless devices (e.g., cellular phones, smart devices, laptops, tablet computers, etc.) when such devices are on-board a vehicle while the vehicle is in en route to a destination. For example, some existing communications systems are able to provide internet-based network connections to mobile devices while on-board a vehicle, such as through Wi-Fi capability. Some other systems exist to support the delivery of terrestrial or native features (e.g., roaming, texting, simultaneous calls, etc.) to mobile or wireless devices while a vehicle is in transit. In particular, to support native, terrestrial features of a mobile or wireless device in a non-terrestrial environment, an on-board communications network system facilitates communications between mobile devices and a ground-based data center.

In certain situations, passengers of the vehicles may be in need of certain travel information. For example, in-flight passengers on an aircraft may wish to know arrival gate information, baggage claim information, and other similar information. Further, certain passengers may have specific travel itineraries with connection information that is not easily communicated to the passengers. Often, flight attendants have to announce this connection information to all the passengers on the plane. However, not only does this require passengers to listen to the whole announcement, but the connection information does not apply to passengers who do not have connections. Additionally, passengers may not want to (or know how to) explicitly retrieve relevant travel information using existing communication channels. Indeed, using a mobile device to locate relevant information from a dedicated website or application is difficult and time consuming.

Accordingly, there is an opportunity to leverage various communication infrastructure components to communicate relevant travel information to passengers. In particular, notifying passengers of flight-specific or itinerary-specific information provides a better travel experience for the passengers. Further, there is an opportunity to compile usage metrics related to in-flight communications in an effort to improve overall service.

SUMMARY

In an embodiment, a method of sending communications to electronic devices aboard an aircraft is provided. The method includes examining registration data to identify (1) the aircraft and (2) at least one electronic device that is connected to an on-board communications network of the aircraft, and determining information associated with the aircraft. The method further includes generating a text-based message comprising the information associated with the aircraft, and transmitting the text-based message to the on-board communications network for delivery to the at least one electronic device.

In another embodiment, a system for sending communications to electronic devices aboard an aircraft is provided. The system includes a communication module configured to send and receive data, and a data center communicatively connected to the communication module. The data center is configured to examine registration data to identify (1) the aircraft and (2) at least one electronic device that is connected to an on-board communications network of the aircraft, and determine information associated with the aircraft. The data center is further configured to generate a text-based message comprising the information associated with the aircraft, and transmit, via the communication module, the text-based message to the on-board communications network for delivery to the at least one electronic device.

DETAILED DESCRIPTION

Figure 1:
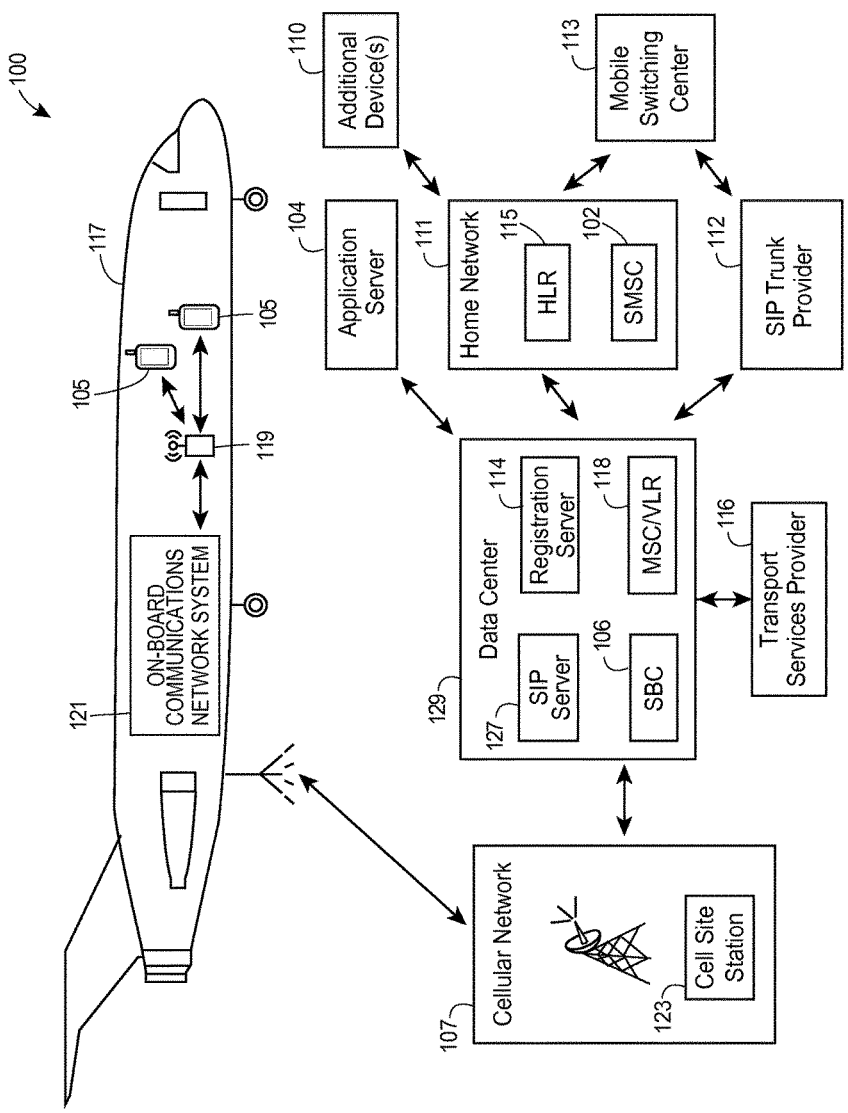
FIG. 1 illustrates an exemplary representation of electronic devices and components capable of facilitating cellular-based communications among electronic devices, in accordance with some embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The systems and methods may be facilitated by a back-end registration server as well as a communication application installed on one or more electronic devices. During a registration of an electronic device with the registration server, the registration server sends a location update for the electronic device to the home network of a user of the electronic device and the home network updates its home location register (HLR) accordingly. Therefore, the location of the electronic device is known within the terrestrial mobile network and the electronic device is configured to roam and send and receive various communications. Accordingly, if the electronic device is on a commercial airlines flight, the HLR can indicate the same. Further, any communications that the electronic device sends when it is on the aircraft can include an aircraft registration (or "tail number") of the aircraft. The registration server can use the aircraft registration to identify various travel information associated with the flight.

The systems and methods as discussed herein offer efficient and effective techniques for communicating information to in-flight passengers. Often, in-flight passengers are not able to easily ascertain relevant travel information before take-off, while in flight, and/or after landing. The travel information may be useful to most or all of the passengers. For example, the passengers may wish to know arrival information (e.g., arrival time, arrival gate), baggage claim information, as well as various information about the destination. Further, some passengers may have an itinerary with connecting flight information. Conventionally, the passengers must explicitly retrieve the travel information, such as via an airline website or app. However, this explicit retrieval can prove difficult and inconvenient.

According to embodiments, the registration server maintains or has access to various travel information, as well as associations between certain aircraft and electronic devices that are located on the aircraft. Further, the registration server has access to various itinerary information associated with the electronic devices. The registration server can therefore generate text-based messages that include certain travel-related data that is relevant to the electronic devices and users thereof. The registration server sends the text-based messages to an on-board communications network system for delivery to the appropriate electronic devices. Further, the registration server can facilitate communications between the electronic devices and any additional devices. Accordingly, the registration server can create usage reports that indicate various metrics associated with the communications.

The systems and methods offer numerous advantages and benefits. In particular, the systems and methods notify passengers of relevant arrival information, connection information, itinerary information (e.g., hotel reservations, taxi information), and other travel information. Therefore, the passengers do not have to explicitly ask anyone or locate the information via a website or application. Further, the systems and methods generate the usage reports that entities such as airlines can use to improve existing services or add new services. Further, the entities and/or communication service providers can use the data to lobby certain agencies or companies (e.g., the FCC or various airlines) to modify or repeal certain communication-based regulations. It should be appreciated that other advantages and benefits of the systems and methods are envisioned.

FIG. 1 illustrates an example representation 100 of components configured to facilitate communications among electronic devices. In particular, the components of the representation 100 are configured to communicate messages to one or more electronic devices 105 that are connected to an on-board communications network system 121. Further, the components of the representation 100 are configured to generate logs or reports that compile or identify data communication activity associated with the one or more electronic devices 105. Specifically, the data communication activity may be between or among the electronic device(s) 105 and one or more additional devices 110.

Generally, as referred to herein, a "terrestrial-based" or "ground-based" network refers to any network that electronic devices may connect to while in a terrestrial environment, but may not easily use to communicate while being transported by a high-speed or high-elevation vehicle such as an airplane. Similarly, a "non-terrestrial-based" or "non-ground-based" network refers to any network that electronic devices may connect to while not in range of a ground-based network or while not able to easily connect to a ground-based network, such as while the electronic devices are being transported by a high-speed or high-elevation vehicle such as an airplane. Typically, ground systems and ground computing devices may be essentially fixed in location, and base stations or infrastructure containing equipment via which devices may wirelessly access the ground system may be contained in one or more buildings or other structures that are fixedly attached to the ground or to earth.

Each of the electronic device(s) 105 and the additional device 110 may be any type of standalone or portable electronic device capable of communicating via one or more networks. For example, each of the electronic device(s) 105 and the additional device 110 may be a mobile phone, a Personal Digital Assistant (PDA), a smart phone, a tablet computer, a multimedia player, a desktop or notebook computer, an MP3 player, a digital broadcast receiver, or any other electronic apparatus. Each of the electronic device(s) 105 and the additional device 110 may also have a subscription or plan with a cellular services provider, whereby the cellular services provider supports cellular communications conducted via the electronic device(s) 105 and/or the additional device 110.

As illustrated in FIG. 1, the electronic device(s) 105 is transported by or otherwise located within a vehicle 117. In embodiments, the vehicle 117 may be owned and/or operated by an individual, or the vehicle may be owned and/or operated by a company, organization or governmental entity. The vehicle 117 may be one of a fleet of vehicles. The vehicle 117 may be used to transport passengers who pay for or otherwise are granted passage on the vehicle. The vehicle 117 may be used to transport executives or staff of a company or organization and their guests. The vehicle 117 may be used to transport live or inanimate cargo, packages, mail, and/or other types of passengers or cargo. Furthermore, although FIG. 1 depicts the vehicle 117 as an aircraft, the techniques and principles described herein equally apply to other types of vehicles such as trucks, automobiles, busses, trains, boats, ships, barges, subway cars, helicopters, ambulances or other emergency vehicles, military vehicles, other air-borne, water-borne, or land-borne vehicles, and vehicles that are suitable for space travel.

The vehicle 117 is equipped with a wireless access point 119 and the on-board communications network system 121. At any given moment in time, the on-board communications network system 121 may be in communicative connection with one or more data or communications networks that are disposed, managed, and/or hosted, for the most part (if not entirely), externally to the vehicle 117. For example, an external network may be a public, ground-based data or communications network, such as the Internet and/or the PSTN (Public Switched Telephone Network). The external network may also be a ground-based private data and/or communications network. Further, the external network may be a cellular network 107 that includes a cell site station 123. Generally, the external network includes ground systems and ground computing devices that are essentially fixed in location. Further, the external network includes base stations or infrastructure containing equipment via which devices may wirelessly access the external network. The base stations or infrastructure containing equipment may be contained in one or more buildings or other structures that are fixedly attached to the ground or to earth.

The electronic device(s) 105 can connect to the on-board communications network system 121 via the wireless access point 119. Generally, the on-board communications network system 121 may be disposed, managed, and/or hosted entirely on-board the vehicle 117. For example, the on-board communications network system 121 may be a Wi-Fi network that is contained and operates within the cabin of the vehicle 117. The on-board communications network system 121 may utilize any known communication protocol or combinations thereof, such as a wireless protocol, a wired protocol, other ARINC standard-compatible protocols, or a private protocol. In an example, the on-board communications network system 121 utilizes an IEEE 802.11 compatible protocol to communicate with the electronic device 105. In another example, the on-board communications network system 121 utilizes a hypertext transfer protocol (HTTP) and a Near Field Communications (NFC)-compatible protocol (e.g., Bluetooth®) to communicate with the electronic device(s) 105.

The on-board communications network system 121 can also facilitate and manage communications between the electronic device(s) 105 and the cell site station 123 of the cellular network 107. According to embodiments, the on-board communications network system 121 and the cell site station 123 may collectively make up an air-to-ground (ATG) communication network for aircraft use. In embodiments, the on-board communications network system 121 and the cell site station 123 can facilitate any type of data communication via any wireless standard or technology (e.g., GSM, CDMA, TDMA, WCDMA, LTE, EDGE, OFDM, GPRS, EV-DO, UWB, and others).

The cell site station 123 of the cellular network 107 can connect, via one or more various wired or wireless networks, to a ground-based data center 129 having components for securely facilitating communications between the electronic device(s) 105 and other electronic devices, such as the additional device(s) 110. In particular, the cell site station 123 includes a session border controller (SBC) and session initiation protocol (SIP) server 127 (which may be separate servers or combined into the same server) and a registration server 114. The registration server 114 may include any combination of hardware and software elements configured to directly or indirectly communicate with the electronic device(s) 105 and the additional device(s) 110, and facilitate the functionalities and communications described herein. Further, the SBC/SIP server 127 can facilitate and manage communication sessions among the electronic device(s) 105, the additional device(s) 110, and the data center 129 using the SIP signaling communications protocol.

As illustrated in FIG. 1, the data center 129 may be configured to connect to and interface with a transport services provider 116. The transport services provider 116 can compile and store information related to travel by a group of vehicles, such as the vehicle 117. For example, the transport services provider 116 may be a server associated with an airline, where the server compiles and stores data related to the data communication activity of devices that travel on certain flights, airplanes, and/or the like. Further, the transport services provider 116 may store general information associated with flights, such as arrival and departure times and gates, baggage claim information, destination information (e.g., weather information, tourist attraction information, etc.), and/or other similar information. The transport services provider 116 may also store itinerary information that is specific for passengers, such as connecting flights, times, and gates, seat assignment information, hotel information, ground transportation information, and/or other similar information. Although FIG. 1 illustrates the transport services provider 116 as separate from the data center 129, it should be appreciated that the transport services provider 116 may be included (or replicated) in the data center 129.

According to embodiments, each of the electronic device(s) 105 can download and install a communication application (not shown in FIG. 1) that enables cellular-based communications when the electronic device(s) 105 is located in the vehicle 117. Further, the electronic device(s) 105 can use the communication application to register and create an account with the registration server 114, as discussed in co-pending application Ser. Nos. 14/291,511 and 14/291,558, the contents of which are hereby incorporated by reference, to enable the electronic device(s) 105 to communicate over various air-borne communication networks, such as an air-to-ground (ATG) communication network for aircraft use. The electronic device(s) 105 can further interface with an application server 104, via the data center 129, to facilitate the purchase of selected products or services. For example, the selected products or services can correspond to enabling certain communications (e.g., text messages, VoIP calls, etc.) for certain periods (e.g., one hour, two hours, a duration of the flight, etc.).

As illustrated in FIG. 1, the registration server 114 may connect, via a cellular-based network, to a home network 111 associated with the electronic device 105. The cellular-based network may be a wide area network (WAN) configured to facilitate any type of data communication via any standard or technology (e.g., GSM, CDMA, TDMA, WCDMA, LTE, EDGE, OFDM, GPRS, EV-DO, UWB, and others). Generally, the home network 111 of the electronic device 105 may be administered or provided by a cellular communications service provider with which the user (i.e., subscriber) of the electronic device 105 has an agreement to send and receive wireless communications services and features. Accordingly, the home network 111 of the electronic device 105 may administrate or manage a home location register (HLR) 115 and/or a visiting location register (VLR) (not shown in FIG. 1), among other databases or components, to support and manage cellular communication, roaming, and other features for the electronic device 105 according to the services agreement. Additionally, the cellular radio frequency (RF) communications band utilized by the home network 111 to wirelessly communicate with mobile devices may be an RF band designated for AMPs, TDMA, CDMA, GSM, PCS, 3G, 4G, 5G, and/or any other terrestrial cellular radio frequency band. Generally, a cellular radio frequency band is a portion of RF spectrum that is allocated by a governmental agency or other body which governs the usage of spectrum. In some networks, more than one cellular RF band may be supported.

The HLR 115 can include a database that stores identifications of electronic devices that are authorized to communicate via the home network 111. In particular, for each authorized device, the HLR 115 can store the corresponding international mobile station identity (IMSI), which is a unique number that identifies each authorized device (or more particularly, identifies the SIM card of each authorized device). The HLR 115 can also pair each IMSI with a mobile subscriber integrated services digital network number (MSISDN) that corresponds to a telephone number of the authorized device. The home network 111 further includes a short message service center (SMSC) 102 configured to store, forward, convert, and deliver cellular-based messages (e.g., text messages such as SMS messages). In particular, the SMSC 102 can forward, to the data center 129, messages originated by the additional device 110 and intended for the electronic device 105. Further, the SMSC 102 can send, to the additional device 110, messages received from the electronic device 105 via the data center 129.

The data center 129 can further be configured to communicate with an SIP trunk provider 112. According to embodiments, the SIP trunk provider 112 enables voice over IP (VoIP) and streaming media communications by which internet telephony service providers (ITSPs) deliver telephone services and unified communications to customers equipped for SIP-based communications. Each of the home network 111 and the SIP trunk provider 112 (as well as the data center 129) may communicate with a mobile switching center (MSC) 113. According to embodiments, the MSC 113 routes voice calls and other messaging services to and from end devices, such as the electronic device 105 and the additional device(s) 110. In particular, the MSC 113 sets up and releases end-to-end connections, and manages mobility and hand-over requirements during calls, among other services as known in the art.

When each of the electronic device(s) 105 registers with the registration server 114, the registration server 114 may store an aircraft registration or "tail number" associated with the vehicle 117 (aircraft) that uniquely identifies the aircraft. Further, each communication (e.g., text message, VoIP call) that originates from or is intended for the electronic device(s) 105 can also indicate the aircraft registration. Therefore, the registration server 114 can maintain records or logs of which electronic device(s) 105 are on which flights as well as metrics associated with the communication activity of the electronic device(s) 105. For example, the registration server 114 can generate flight-by-flight reports that detail the amount and types of communications conducted by the electronic device(s) 105.

According to embodiments, the components of the representation 100 are configured to generate messages and communicate the messages to the electronic device(s) 105. In particular, the data center 129 can generate and transmit text-based messages to the on-board communications network system 121 for delivery to one or more of the electronic device(s) 105 that have registered and/or created an account with the registration server 114. In some cases, the data center 129 can transmit a text-based message to each of the registered electronic device(s) 105 traveling on the vehicle 117. For example, the data center 129 may interface with the transport services provider 116 to identify information relevant to a specific flight on which users of the electronic device(s) 105 are passengers (e.g., arrival information, baggage claim information, weather information, re-routing information, etc.). In other cases, the data center 129 can transmit a text-based message that is specific to one or more, but not all, of the registered electronic device(s) 105. For example, the data center 129 may interface with the transport services provider 116 to examine an itinerary of a passenger, identify relevant trip information, and include the relevant trip information in the text-based message.

In another embodiment, the data center 129 may compile reports or logs indicating communication activity by the electronic device(s) 105. In particular, the reports may include the number of text-based messages or voice-based communications that are initiated or received by the electronic device(s) 105 on a particular flight, during a particular time period, or according to other parameters. The reports may be examined or reviewed by the transport services provider 116 (e.g., an airline) or another entity in an effort to improve or modify services, change pricing strategies, solicit business partners (e.g., advertisers), lobby certain government organizations, and/or the like.

Figure 2:
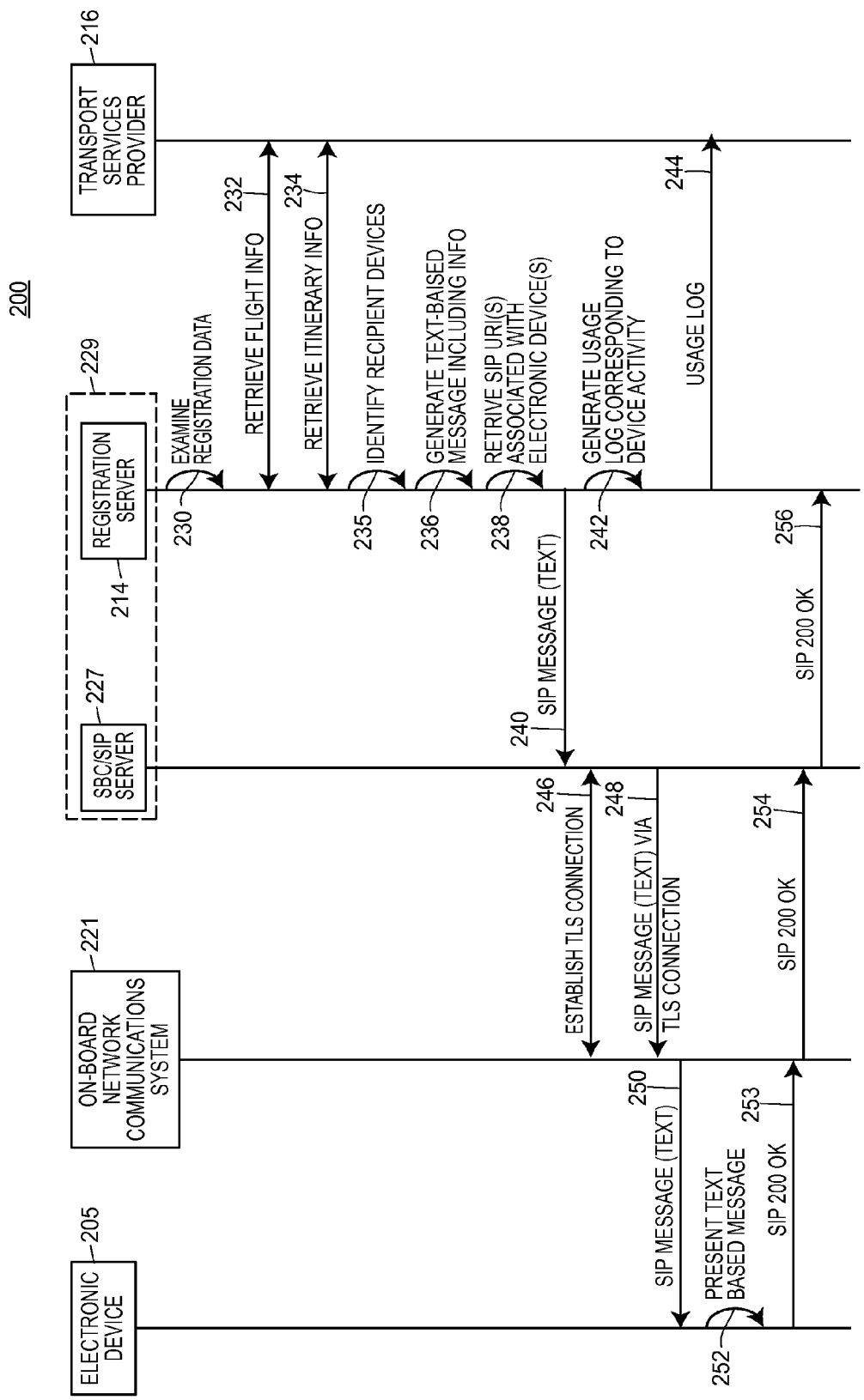
FIG. 2 depicts an example signal diagram associated with providing travel information to electronic devices and generating usage reports associated with various communication activity, in accordance with some embodiments.

FIG. 2 illustrates a signal diagram 200 that details a data center 229 communicating with one or more electronic devices 205 connected to an on-board communications network system 221, such as if the electronic device(s) 205 is located on board a vehicle such as an aircraft. The signal diagram 200 further depicts a registration server 214 generating a report or log associated with communication activity of the one or more electronic devices 205. The signal diagram 200 includes the one or more electronic devices 205 (such as the electronic device(s) 105 as discussed with respect to FIG. 1), the on-board network communications system 221 (such as the on-board network communications system 121), a data center 229 including an SBC/SIP server 227 (such as the SBC/SIP server 127 as discussed with respect to FIG. 1) and the registration server 214 (such as the registration server 114 as discussed with respect to FIG. 1), and a transport services provider 216 (such as the transport services provider 116 as discussed with respect to FIG. 1). According to embodiments, the on-board communications network system 221 to which the electronic device(s) 105 is connected is associated with the transport services provider 216. For example, the on-board network communications system 221 may be on board an aircraft owned and operated by an airline.

For purposes of discussion, it should be appreciated that the electronic device(s) 205 has already completed the registration procedure with the registration server 214, and optionally has also purchased a product or service that enables cellular-based communication via the non-terrestrial-based network. Further, for purposes of discussion, it should be appreciated that the on-board network communications system 221 is installed on an aircraft and the transport services provider 216 is associated with a corresponding airline. Accordingly, the user(s) of the electronic device(s) 205 may be considered passenger(s) on the aircraft (and therefore customer(s) of the airline). As discussed herein, the aircraft has an aircraft registration (or "tail number") that uniquely identifies the aircraft. According to embodiments, each communication (e.g., text message, VoIP call) that originates from or is intended for the one or more electronic devices 205 can indicate the aircraft registration. As it receives a particular communication, the registration server 214 may record an instance of the communication as well as the aircraft registration indicated by the communication. Accordingly, the registration server 214 may maintain records that identify metrics associated with the communications. For example, a record associated with an aircraft registration may indicate how many communications as well as the types of communications that originate from and are intended for the electronic device(s) 205 on a particular flight.

The functionalities of the signal diagram 200 may be initiated automatically (e.g., in response to a trigger) or by a user or administrator interfacing with the registration server 214. For example, the registration server 214 may automatically facilitate the functionalities of the signal diagram 200 before, during, or after a specific flight. For further example, an administrator may interface with the registration server 214 to initiate the functionalities of the signal diagram 200 if the administrator needs to communicate specific information to the electronic device(s) 205. The registration server 214 may initiate the functionalities of the signal diagram 200 by examining (230) registration data. In particular, the registration data may identify which of the electronic device(s) 205 have registered with the registration server 214 and/or are otherwise connected to the on-board network communications system 221. In an optional embodiment, the registration data may also identify which of the electronic device(s) 205 have purchased or signed up for a product or service that enables cellular-based communication. Further, the registration data may include the aircraft registration of the aircraft on which the electronic device(s) 205 is traveling.

In some cases, the registration server 214 can retrieve (232) flight information from the transport services provider 216. According to embodiments, the flight information can include the flight schedule, departure and arrival information (e.g., gate, time, etc.), airport information (e.g., layout maps), baggage claim information, weather information, tourist attraction information, and/or other information. In some additional or alternative cases, the registration server 214 can retrieve (234) itinerary information from the transport services provider 216. According to embodiments, the registration server 214 can send an identification(s) of the electronic device(s) 205 to the transport services provider 216, where the transport services provider 216 can use the identification(s) to retrieve the desired itinerary information. For example, the itinerary information can include connecting flight information, such as gate, departure time, and changes in departure time, as well as any associated hotel information, ground transportation information, and/or other information.

The registration server 214 can identify (235) which of the electronic device(s) 205 are to receive a text-based message. In some cases, the registration server 214 can identify each of the electronic device(s) 205 that are registered with the registration server 214 and that optionally have purchased a product or service. In other cases, the registration server 214 can identify one or more specific electronic device(s) 205 whose users may benefit from receiving a text-based message. For example, there may be a change in the schedule of a connecting flight for a particular passenger. The registration server 214 can generate (236) one or more text-based messages including any combination of the flight information and/or itinerary information retrieved from the transport services provider 216, where the one or more text-based messages are to be sent to the corresponding electronic device(s) 205. For example, a first text-based message can identify an arrival gate for the flight as well a baggage claim number, and can be intended for each electronic device 205 on the flight. For further example, a second text-based message can identify connecting flight information from a specific itinerary, and can be intended for an electronic device 205 having that specific itinerary.

The registration server 214 can retrieve (238) an SIP uniform resource identifier (URI) associated with an identification of the electronic device(s) 305 that is to receive the text-based message. In particular, the SIP URI may have been previously associated with the IMSI and/or with the MSISDN during the registration of the electronic device(s) 205 with the registration server 214. The registration server 214 can convert the generated text-based message into an SIP message using the SIP URI, according to various techniques or communication protocols (e.g., CDMA, GSM, etc.). The registration server 214 can also send (240) the SIP message(s) with the SIP URI to the SBC/SIP server 227.

The registration server 214 can generate or update (242) a usage log or report associated with communication activity of the electronic device(s) 205 on the aircraft. According to embodiments, the usage log can identify a number of text-based messages or voice-based communications initiated by or destined for the electronic device(s) 205. The registration server 214 can also send (244) the usage log to the transport services provider 216 for review or for other various usages. For example, an airline may wish to review metrics associated with device communication in an effort to gauge trends, improve or add services, restructure pricing plans, or for other purposes.

Responsive to receiving the SIP message(s), the SBC/SIP server 227 can establish (246) a TLS connection with the on-board network communications network system 221 using a digital certificate or according to other techniques. Further, the SBC/SIP server 227 can send (248) the SIP message(s) to the on-board network communications system 221 via the established TLS connection. The on-board network communications system 221 can send (250) the SIP message(s) to the appropriate electronic device(s) 205. In particular, the on-board network communications system 221 may send a general message to each electronic device 205 on the flight and/or may send an itinerary-specific message to a single electronic device 205 on the flight. The destination device(s) 205 can present (252) the received SIP message to a user of the destination device(s) 205. In some embodiments, the destination device(s) 205 can present the body or textual portion of the SIP message via an application installed on the destination device 305. After receiving the SIP message, the destination device(s) 205 can send (253) a message received acknowledgement (e.g., an SIP 200 OK message) to the on-board network communications system 221, which can be respectively forwarded (254) to the SBC/SIP server 227 and (256) to the registration server 214.

Figure 3:
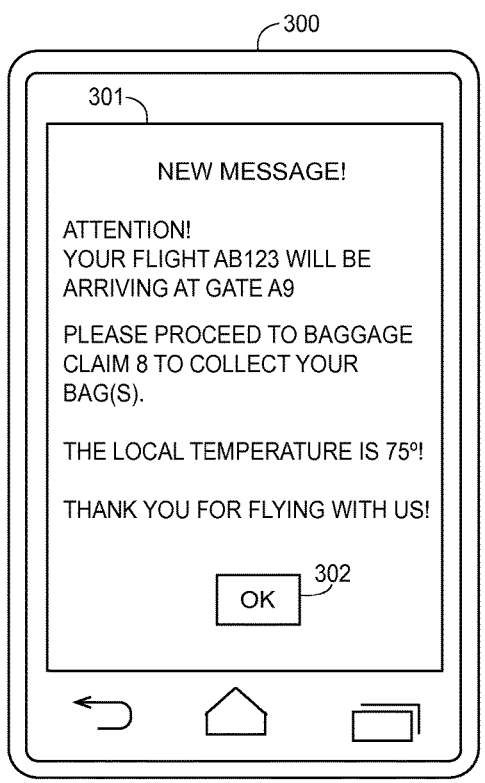
FIG. 3 is an example interface illustrating an example text-based communication, in accordance with some embodiments.
Figure 4:
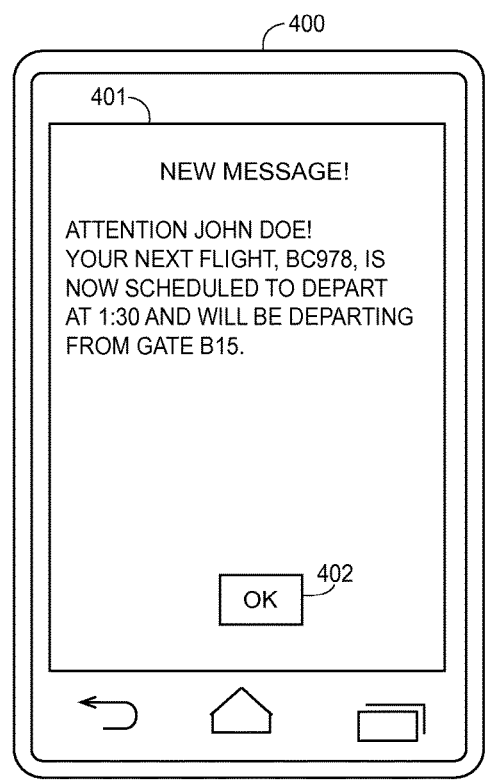
FIG. 4 is an example interface illustrating an example text-based communication, in accordance with some embodiments.

Referring to FIGS. 3 and 4, depicted are example interfaces associated with the text-based messaging techniques as discussed herein. An electronic device (such as the electronic device 105) can display the example interfaces on a user interface and enable a user to interact with the example interfaces via the user interface. According to embodiments, the electronic device can display the interfaces in situations in which the electronic device is connected to a non-terrestrial network (e.g., the on-board communications network system 121) and has registered with the registration server 114. It should be appreciated that the interfaces are examples and may include additional or alternative content than what is illustrated in FIGS. 3 and 4.

As illustrated in FIG. 3, an example interface 300 presents a message 301 or notification that may be sent to each electronic device on a particular flight and that is registered with the registration server 114. The message 301 may correspond to the SIP message that the on-board communications network system sends to an electronic device, as discussed with respect to FIG. 2. In embodiments, the registration server 114 may retrieve at least some of the content of the message 301 (e.g., the flight information) from the transport services provider 216. As illustrated in FIG. 3, the message 301 indicates the flight number ("AB123"), the arrival gate ("A9"), the baggage claim number ("8"), and weather information for the arrival location. The message 301 can further include a selectable option 302 that enables a user to dismiss the message 301. In particular, if the user selects the "OK" option 302, the electronic device may dismiss the message 301.

As illustrated in FIG. 4, an example interface 400 presents a message 401 or notification that may be sent to a specific device that is registered with the registration server 114. In particular, the message 401 may include flight and/or itinerary information that is specific to the electronic device. In embodiments, the registration server 114 may retrieve at least some of the content of the message 401 (e.g., itinerary information) from the transport services provider 216. As illustrated in FIG. 4, the message 401 indicates the passenger's name ("John Doe"), the passenger's next scheduled flight ("BC978"), the scheduled departure time of the next flight ("1:30"), and the departure gate ("B15"). The message 401 can further include a selectable option 402 that enables a user to dismiss the message 401. In particular, if the user selects the "OK" option 402, the electronic device may dismiss the message 401. In some embodiments, the electronic device may also display a map that indicates directions to get to the next gate or to baggage claim.

Figure 5:
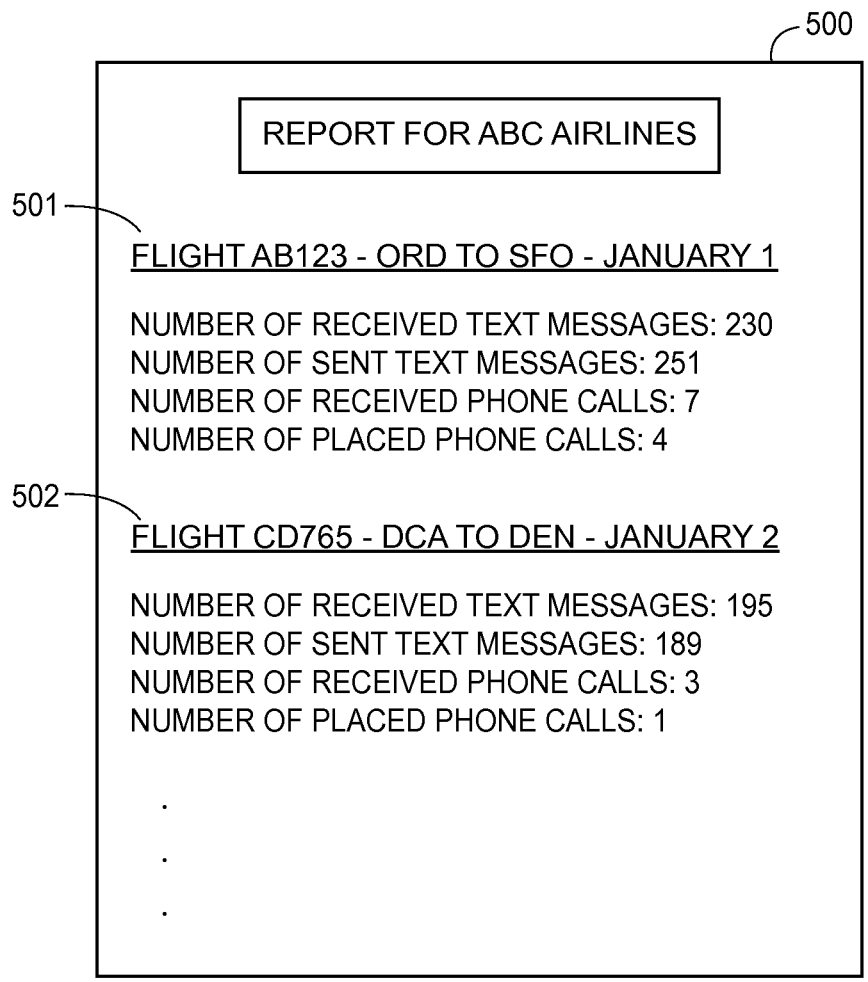
FIG. 5 is an example interface illustrating an example report of communication activity, in accordance with some embodiments.

Referring to FIG. 5, depicted is an example report 500 associated with the report generation techniques as discussed herein. An electronic device (such as the electronic device 105 or another electronic device) can display the report 500 on a user interface and enable a user to interact with the report 500 via the user interface. For example, a user or administrator associated with a transport services provider (e.g., an airline) may access the report 500 to review and analyze information. It should be appreciated that the report 500 is an example and may include additional or alternative content than what is illustrated in FIG. 5.

As illustrated in FIG. 5, the report 500 details information for an example airline "ABC Airlines." The report 500 includes information associated with two example flights: flight "AB123" (501) and flight "CD765" (502). The report 500 includes data associated with the communication activity for the electronic devices on the respective flight (or, at least, the electronic devices that have registered with the registration server). For example, the report 500 indicates that on flight AB123, the electronic devices collectively received 230 text messages, sent 251 text messages, received 7 phone calls, and placed 4 phone calls. For further example, the report 500 indicates that on flight CD765, the electronic devices collectively received 195 text messages, sent 189 text messages, received 3 phone calls, and placed 1 phone call. According to embodiments, the report 500 may compile information based on a time period (e.g., daily, weekly, etc.), based on individual flights, and/or based on other metrics or parameters. An entity associated with the report 500 (e.g., an airline) may use the information of the report 500 to modify or improve communication services, to create new or improved pricing models, or for other benefits.

Further, the entity may use the information to lobby certain groups or agencies (e.g., the FCC) to modify or repeal certain regulations.

Figure 6:
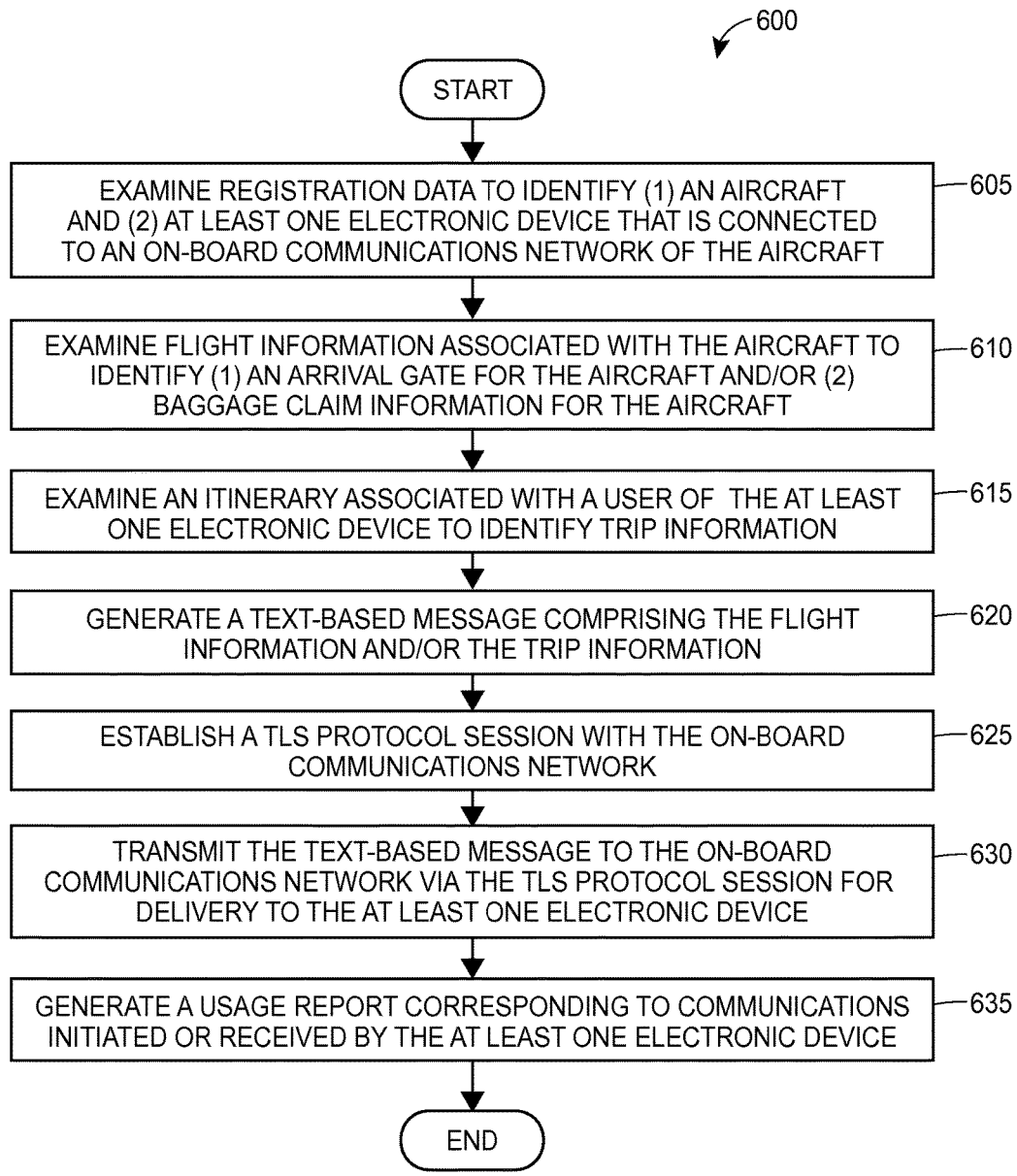
FIG. 6 depicts a flow diagram of a data center providing travel information to electronic devices and generating usage reports associated with various communication activity, in accordance with some embodiments.

FIG. 6 illustrates an example method 600 for communicating with in-flight electronic devices and reporting communication data associated with the electronic devices. The method 600 may operate in conjunction with any or all portions of the systems, vehicles and/or electronic devices previously discussed with respect to FIGS. 1-5, or the method 600 may operate in conjunction with other suitable systems, vehicles, and/or electronic devices. In an embodiment, at least a portion of the method 600 may be performed by a data center including an SBC/SIP server and/or a registration server, such as the data center 129 as described with respect to FIG. 1.

At a block 605, the data center may examine registration data to identify an aircraft and at least one electronic device that is connected to an on-board communications network of the aircraft. In embodiments, the at least one electronic device may have previously registered with the data center, whereby the registration indicates the aircraft (e.g., by way of an aircraft registration) on which the at least one electronic device is traveling. At a block 610, the data center may examine flight information associated with the aircraft to identify various information specific to the aircraft flight. In particular, the data center may interface with a transport services provider (e.g., the associated airline) to identify an arrival gate for the aircraft, baggage claim information for the aircraft, weather information, tourist attraction information, and/or other information.

At a block 615, the data center may examine an itinerary associated with a user of the at least one electronic device to identify relevant trip information. In particular, the data center may interface with the transport services provider to identify flight connection information, hotel information, transportation information, and/or other information that may be included in an itinerary. At a block 620, the data center may generate one or more text-based messages comprising some combination of the flight information and/or the trip information. According to embodiments, the text-based message may be an SIP message comprising body text data configured to be presented to a user of the at least one electronic device. In some cases, the content of a first text-based message may include information specific to the aircraft that may be intended for all of the registered electronic devices on the aircraft. In other cases, the content of a second text-based message may include information specific to one passenger on the aircraft.

At a block 625, the data center may establish a TLS protocol session with the on-board communications network. At a block 630, the data center may transmit one or more text-based messages via the TLS protocol session to the on-board communications network for delivery to the at least one electronic device. In some embodiments, the data center can transmit, to the on-board communications network system, an SIP message identifying the at least one electronic device and including the text-based message, where the on-board communications network system delivers to the at least one electronic device. The data center may further receive an SIP OKAY response indicating that the at least one electronic device has received the text-based message.

At a block 635, the data center may generate a usage report corresponding to communications initiated or received by the at least one electronic device. In particular, the usage report may include the number of received or sent text messages, the number of received or placed voice calls, and/or other data. The usage report may indicate communication data associated with any amount of the electronic devices that are registered with the data center, where the usage report may organize or compile the communication data according to various time periods or other metrics.

Figure 7:
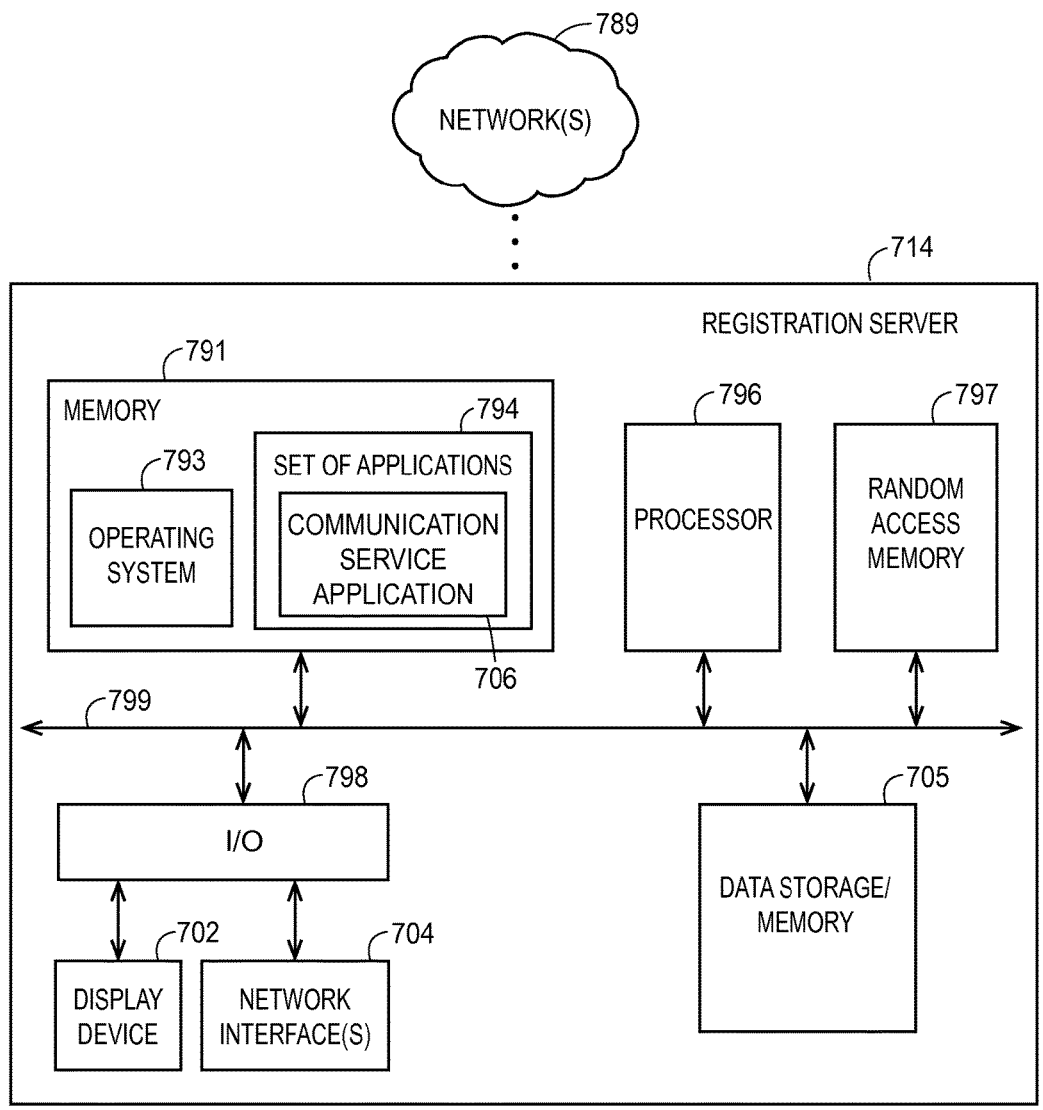
FIG. 7 is a block diagram of a registration server in accordance with some embodiments.

FIG. 7 illustrates a block diagram of an example registration server 714 which may operate in accordance with any of (and/or any one or more portions of) the systems, methods, techniques and concepts discussed herein. In an embodiment, the registration server 714 may be any of the registration servers 114, 214 as discussed with respect to FIGS. 1 and 2.

The registration server 714 may include a processor 796 (which may be called a controller, microcontroller or a microprocessor, in some embodiments) for executing computer-executable instructions, a program memory 791 for permanently storing data related to the computer-executable instructions, a random-access memory (RAM) or other suitable memory 797 for temporarily storing data related to the computer-executable instructions, and an input/output (I/O) circuit or component 798, all of which may be interconnected via an address/data bus or suitable bus 799. As used herein, the terms "computer-executable instructions," "computer executable instructions," and "instructions" are used interchangeably.

The registration server 714 may include one or more network interfaces 704 via which the registration server 714 may wirelessly connect with one or more respective networks 789 or devices. Generally, the network interfaces 704 enable the registration server 714 to connect to devices and entities over respective cellular radio frequency (RF) bands, e.g., AMPs, TDMA, CDMA, GSM, PCS, 3G, 4G, 5G, and/or any other terrestrial cellular radio frequency band. For example, the registration server 714 may communicate with an electronic device via a terrestrial base station or small cell using one or the network interfaces 704. Generally, the term "cellular radio frequency band," as used herein, refers to a portion of RF spectrum that is allocated by a governmental agency or other body which governs the usage of spectrum. The one or more network interfaces 704 may enable the registration server 714 to communicate over one or more cellular radio frequency bands (e.g., in terrestrial environments), and may include one or more corresponding transceivers. Although not shown in FIG. 7, the registration server 714 may also include one or more wireless network interfaces that enable the registration server 714 to communication via non-cellular-based networks, such as local area networks.

With further regard to FIG. 7, it should be appreciated that although only one processor 796 is shown, the registration server 714 may include multiple processors 796. Similarly, the memory of the registration server 714 may include multiple RAMs (Random Access Memories) 797, multiple program memories 791, and/or one or more other data storage entities or types of memories 705. The RAM(s) 797, program memories 791, and/or the data storage entities 705 may be implemented as one or more semiconductor memories, magnetically readable memories, optically readable memories, biological memories, and/or other tangible, non-transitory computer-readable storage media, for example.

Furthermore, the IO circuit 798 may connect to a display device 702. For example, the display device 702 may enable a user or administrator of the registration server 714 to manage the communication facilitation, view reports, and/or perform other functions. The registration server 714 may also include other elements common to general purpose computing devices (not shown).

The memory 791 can store an operating system 793 capable of facilitating the functionalities as discussed herein. The processor 796 can interface with the memory 791 to execute the operating system 793, as well as execute a set of applications 794 comprising computer-executable electronic instructions for facilitating various registration and communication facilitation features. In particular, the set of applications 794 can include a communications service application 706 configured to generate and facilitate the text-based communications discussed herein. It should be appreciated that other applications are envisioned.

In some embodiments, the computer-executable instructions for the set of applications 794 may be configured to cause the registration server 714 to perform one or more portions of one or more of the methods described herein. The computer-executable instructions may be stored on a tangible, non-transitory computer-readable storage medium, such as on the memory 791 or on some other suitable memory. Furthermore, the computer-executable instructions may be executable by the one or more processors 796. The computer-executable instructions may be downloaded or otherwise delivered to the registration server 714.

Figure 8:
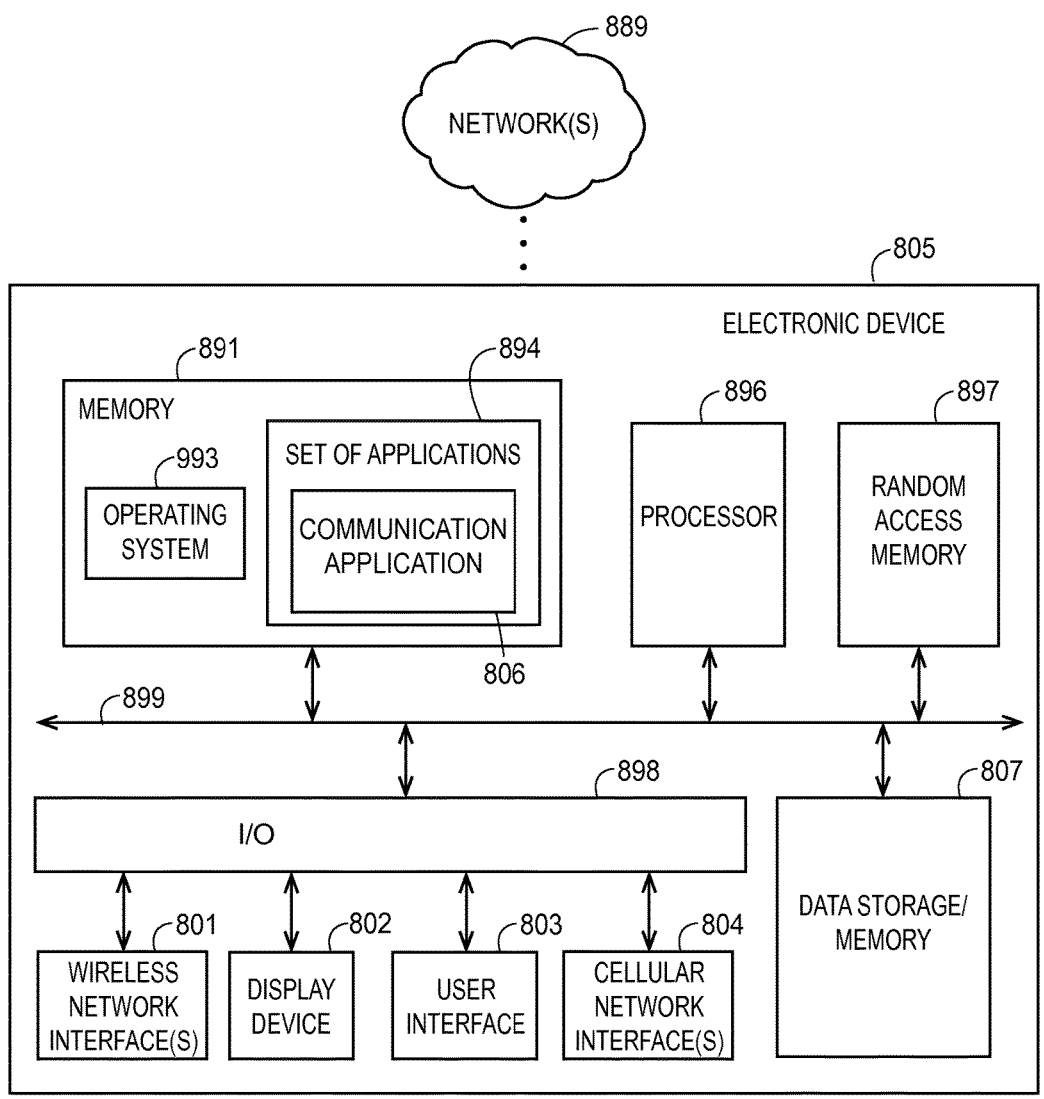
FIG. 8 is a block diagram of an electronic device in accordance with some embodiments.

FIG. 8 illustrates a block diagram of an example electronic device 805 which may operate in accordance with any of (and/or any one or more portions of) the systems, methods, techniques and concepts discussed herein. The electronic device 805 may be, for example, a smart phone, a smart device, a laptop, a tablet, an electronic reading device, or any other communications or computing device that is configured to communicate wirelessly. In an embodiment, the electronic device 805 may be any of the electronic devices 105, 205 (or any of the additional devices 110) as described with respect to FIGS. 1 and 2.

The electronic device 805 may include a processor 896 (which may be called a controller, microcontroller or a microprocessor, in some embodiments) for executing computer-executable instructions, a program memory 891 for permanently storing data related to the computer-executable instructions, a random-access memory (RAM) or other suitable memory 897 for temporarily storing data related to the computer-executable instructions, and an input/output (I/O) circuit or component 898, all of which may be interconnected via an address/data bus or suitable bus 899. As used herein, the terms "computer-executable instructions," "computer executable instructions," and "instructions" are used interchangeably.

The electronic device 805 may include one or more wireless network interfaces 801 via which the electronic device 805 may wirelessly connect with one or more networks 889 or devices. In an embodiment, the one or more wireless network interfaces 801 enable the electronic device 805 to wirelessly connect to one or more other networks or devices that are included or contained in a terrestrial or a non-terrestrial environment. For example, the electronic device 805 may communicatively connect to a non-terrestrial, local network (e.g., a non-terrestrial wireless Local Area Network (LAN) hosted on-board a vehicle) using a wireless Ethernet protocol over one of the wireless network interfaces 801. Additionally or alternatively, the electronic device 805 may communicatively connect to a local wireless network or device using a Near Field Communications (NFC) protocol (e.g., Bluetooth) over one of the wireless network interfaces 801. Generally, the one or more wireless network interfaces 801 may support any radio frequency band other than cellular radio frequency bands, and the one or more wireless network interfaces 801 may include one or more corresponding transceivers. In an embodiment, the wireless network interfaces 801 communicates with a wireless access point (such as a wireless access point on an airplane), which allows the electronic device 805 to connect to an on-board network.

The electronic device 805 may further include one or more cellular wireless interfaces 804 to support communications over respective cellular radio frequency (RF) bands, e.g., AMPs, TDMA, CDMA, GSM, PCS, 3G, 4G, 5G, and/or any other terrestrial cellular radio frequency band. For example, the electronic device 805 may communicate with a terrestrial base station or small cell using one or the cellular network interfaces 804. Further, the electronic device 805 may communicate with a registration server (such as the registration server 714 as described with respect to FIG. 7) over a WAN using one of the cellular network interfaces 804. Generally, the term "cellular radio frequency band," as used herein, refers to a portion of RF spectrum that is allocated by a governmental agency or other body which governs the usage of spectrum. The cellular network interfaces 804 may allow the electronic device 805 to communicate over one or more cellular radio frequency bands (e.g., in terrestrial environments), and may include one or more corresponding transceivers. In an embodiment, the one or more cellular network interfaces 804 are not used by the electronic device 805 to communicate in non-terrestrial environments. In an embodiment, the one or more wireless network interfaces 801 and the one or more cellular network interfaces 804 may each be independently activated and deactivated.

With further regard to FIG. 8, it should be appreciated that although only one processor 896 is shown, the electronic device 805 may include multiple processors 896. Similarly, the memory of the electronic device 805 may include multiple RAMs (Random Access Memories) 897, multiple program memories 891, and/or one or more other data storage entities or types of memories 807. The RAM(s) 897, program memories 891, and/or the data storage entities 807 may be implemented as one or more semiconductor memories, magnetically readable memories, optically readable memories, biological memories, and/or other tangible, non-transitory computer-readable storage media, for example.

Furthermore, although the I/O circuit 898 is shown as a single block, it should be appreciated that the I/O circuit 898 may include a number of different types of I/O circuits or connections. For example, a first I/O circuit may correspond to a display device 802, and the first or a second I/O circuit may correspond to a user interface 803. The user interface 803 in combination with the display device 802 may include various I/O components (e.g., capacitive or resistive touch sensitive input panels, keys, buttons, lights, LEDs, cursor control devices, haptic devices, and others). In embodiments, the display device 802 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 803 may further include audio components such as a microphone and/or a speaker. The electronic device 805 may also include other elements common to general purpose computing devices (not shown).

The memory 891 can store an operating system 893 capable of facilitating the functionalities as discussed herein. The processor 896 can interface with the memory 891 to execute the operating system 893 as well as execute a set of applications 894 comprising computer-executable electronic instructions for facilitating various registration features. In particular, the set of applications 894 can include a communication application 806 configured to facilitate the communications as discussed herein. For example, the communication application 806 can initiate and receive text-and voice-based communications. It should be appreciated that other applications are envisioned, such as a dedicated SMS messaging application.

In some embodiments, the computer-executable instructions for the set of applications 894 may be configured to cause the electronic device 805 to perform one or more portions of one or more of the methods described herein. The computer-executable instructions may be stored on a tangible, non-transitory computer-readable storage medium, such as on the memory 891 or on some other suitable memory. Furthermore, the computer-executable instructions may be executable by the one or more processors 896. The computer-executable instructions may be downloaded or otherwise delivered to the electronic device 805.

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of sending communications from a server to electronic devices aboard an aircraft, the method comprising:

determining that an electronic device has previously completed a registration with the server, the electronic device connected to an on-board communications network of the aircraft, the registration indicating an aircraft registration that uniquely identifies the aircraft, wherein as part of the registration the server updates a location of the electronic device with a home location register (HLR);

after the at least one electronic device completes the registration, connecting to the HLR that stores an international mobile station identity (IMSI) of the electronic device registered with the server;

identifying, by a processor, (1) the aircraft registration and (2) the IMSI associated with the electronic device;

determining information associated with the aircraft;

generating, by the processor, a text-based message comprising at least a portion of the information associated with the aircraft;

transmitting the text-based message to the on-board communications network for delivery to the electronic device according to the IMSI;

generating a usage report indicating a number of text-based messages collectively received by the electronic device and at least one additional electronic device of the electronic devices aboard the aircraft; and providing the usage report to a transport services provider associated with the aircraft.

2. The method of claim 1, wherein determining information associated with the aircraft comprises:

examining flight information associated with the aircraft to identify at least one of (1) an arrival gate for the aircraft and (2) baggage claim information for the aircraft.

3. The method of claim 1, wherein determining information associated with the aircraft comprises:

examining an itinerary associated with a user of the electronic device to identify trip information.

4. The method of claim 1, wherein generating the text-based message comprises:

generating a session initiation protocol (SIP) message comprising body text data configured to be presented to a user of the electronic device.

5. The method of claim 1, wherein transmitting the text-based message comprises:

establishing a transport layer security (TLS) protocol session with the on-board communications network; and transmitting the text-based message via the TLS protocol session.

6. The method of claim 1, further comprising:

identifying a plurality of electronic devices registered with the server;

and wherein determining the information associated with the aircraft comprises:

determining travel information that is relevant to each of the plurality of electronic devices.

7. The method of claim 1, further comprising:

identifying a plurality of electronic devices registered with the server;

and wherein determining the information associated with the aircraft comprises:

determining itinerary information that is relevant to a subset of the plurality of electronic devices.

8. A system for sending communications to electronic devices aboard an aircraft, comprising:

a communication module configured to send and receive data; and a data center communicatively connected to the communication module and configured to:

determine that an electronic device has previously completed a registration with the data center, the electronic device connected to an on-board communications network of the aircraft, the registration indicating an aircraft registration that uniquely identifies the aircraft, wherein as part of the registration the data center updates a location of the electronic device with a home location register (HLR), after the at least one electronic device completes the registration, connect to the HLR that stores an international mobile station identity (IMSI) of the electronic device registered with the data center, identify (1) the aircraft registration and (2) the IMSI associated with the electronic device, determine information associated with the aircraft, generate a text-based message comprising at least a portion of the information associated with the aircraft, and transmit, via the communication module, the text-based message to the on-board communications network for delivery to the electronic device according to the IMSI, generate a usage report indicating a number of text-based messages collectively received by the electronic device and at least one additional electronic device of the electronic devices aboard the aircraft, and provide the usage report to a transport services provider associated with the aircraft.

9. The system of claim 8, wherein to determine the information associated with the aircraft, the data center is configured to:

examine flight information associated with the aircraft to identify at least one of (1) an arrival gate for the aircraft and (2) baggage claim information for the aircraft.

10. The system of claim 8, wherein to determine the information associated with the aircraft, the data center is configured to:

examine an itinerary associated with a user of the electronic device to identify trip information.

11. The system of claim 8, wherein to generate the text-based message, the data center is configured to:

generate a session initiation protocol (SIP) message comprising body text data configured to be presented to a user of the electronic device.

12. The system of claim 8, wherein to transmit the text-based message, the data center is configured to:

establish a transport layer security (TLS) protocol session with the on-board communications network via the communication module, and transmit the text-based message via the TLS protocol session.

13. The system of claim 8, wherein the data center is further configured to:

identify a plurality of electronic devices registered with the data center;

and wherein to determine the information associated with the aircraft, the data center is configured to:

determine travel information that is relevant to each of the plurality of electronic devices.

14. The system of claim 8, wherein the data center is further configured to:

identify a plurality of electronic devices registered with the data center;

and wherein to determine the information associated with the aircraft, the data center is configured to:

determine itinerary information that is relevant to a subset of the plurality of electronic devices.

* * * * *